US012577067B1

(12) United States Patent
Rest

(10) Patent No.: US 12,577,067 B1
(45) Date of Patent: Mar. 17, 2026

(54) ROBOTIC DEPALLETIZATION SYSTEM AND METHOD

(71) Applicant: Hand Held Products, Inc., Charlotte, NC (US)

(72) Inventor: Adam Ming Rest, Pittsburgh, PA (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/885,248

(22) Filed: Sep. 13, 2024

(51) Int. Cl.
*B65G 61/00* (2006.01)

(52) U.S. Cl.
CPC ...... *B65G 61/00* (2013.01); *B65G 2203/0233* (2013.01); *B65G 2203/044* (2013.01)

(58) Field of Classification Search
CPC ............ B65G 61/00; B65G 2203/0233; B65G 2203/044; B65G 59/02; B65G 2203/041; B25J 9/1697; B25J 19/021; B25J 19/022; B25J 19/023; B25J 9/1664; B65H 2553/42; G01B 11/2518
USPC ....... 700/214, 195, 259, 98; 414/796.5, 799; 356/601, 511, 3, 495; 382/103, 110
See application file for complete search history.

(56) References Cited

U.S. PATENT DOCUMENTS

| | | | | | |
|---|---|---|---|---|---|
| 8,619,331 | B2 * | 12/2013 | Qiao | .................. | G03G 15/6585 |
| | | | | | 358/3.08 |
| 10,591,289 | B2 * | 3/2020 | McLean | ............... | G01B 11/005 |
| 10,981,736 | B2 * | 4/2021 | Morency | ................ | B65G 61/00 |
| 11,167,423 | B1 | 11/2021 | Hoffman et al. | | |
| 11,441,891 | B2 * | 9/2022 | Staaden | ................. | G01B 21/04 |
| 2002/0057339 | A1 * | 5/2002 | Shoenfeld | ............ | G01N 21/894 |
| | | | | | 348/86 |
| 2017/0108447 | A1 * | 4/2017 | Lin | ....................... | G06T 7/0004 |
| 2018/0161985 | A1 * | 6/2018 | Kobayashi | ............ | B25J 9/1692 |
| 2019/0308823 | A1 | 10/2019 | Beer et al. | | |
| 2022/0362936 | A1 * | 11/2022 | Makhal | .................. | B25J 9/1687 |
| 2022/0366558 | A1 * | 11/2022 | Bufi | .................. | G01N 35/0099 |

(Continued)

FOREIGN PATENT DOCUMENTS

| | | |
|---|---|---|
| CN | 209728298 U | 12/2019 |
| CN | 213579203 U | 6/2021 |

(Continued)

OTHER PUBLICATIONS

Extended European Search Report Mailed on Jan. 22, 2026 for EP Application No. 25195155, 11 page(s).

*Primary Examiner* — Gregory W Adams
(74) *Attorney, Agent, or Firm* — Alston & Bird LLP

(57) ABSTRACT

A robotic depalletization system is disclosed. The robotic depalletization system comprises a robotic arm configured to pick the plurality of objects. Further, the robotic depalletization system comprises a vision system. The vision system comprises a first rail, a first actuator, and a plurality of laser profilometers. The first actuator is configured to move the first rail in a horizontal direction over the plurality of objects. The plurality of laser profilometers is configured to measure geometric dimensions of the plurality of objects. The vision system comprises at least one processor that is configured to identify locations of edges of each of the plurality of objects based on the geometric dimensions of the plurality of objects and generate one or more signals to control the robotic arm to pick the plurality of objects based on the identified locations of the edges of each of the plurality of objects.

18 Claims, 6 Drawing Sheets

(56) References Cited

U.S. PATENT DOCUMENTS

| | | | |
|---|---|---|---|
| 2023/0136488 A1 | 5/2023 | Hara et al. | |
| 2023/0159284 A1 | 5/2023 | Nilson et al. | |
| 2023/0278221 A1* | 9/2023 | Simon .................... | B25J 9/1692 |
| | | | 700/217 |

FOREIGN PATENT DOCUMENTS

| | | | |
|---|---|---|---|
| CN | 116372952 A | 7/2023 | |
| WO | 2023/084440 A2 | 5/2023 | |
| WO | 2023/123221 A1 | 7/2023 | |

* cited by examiner

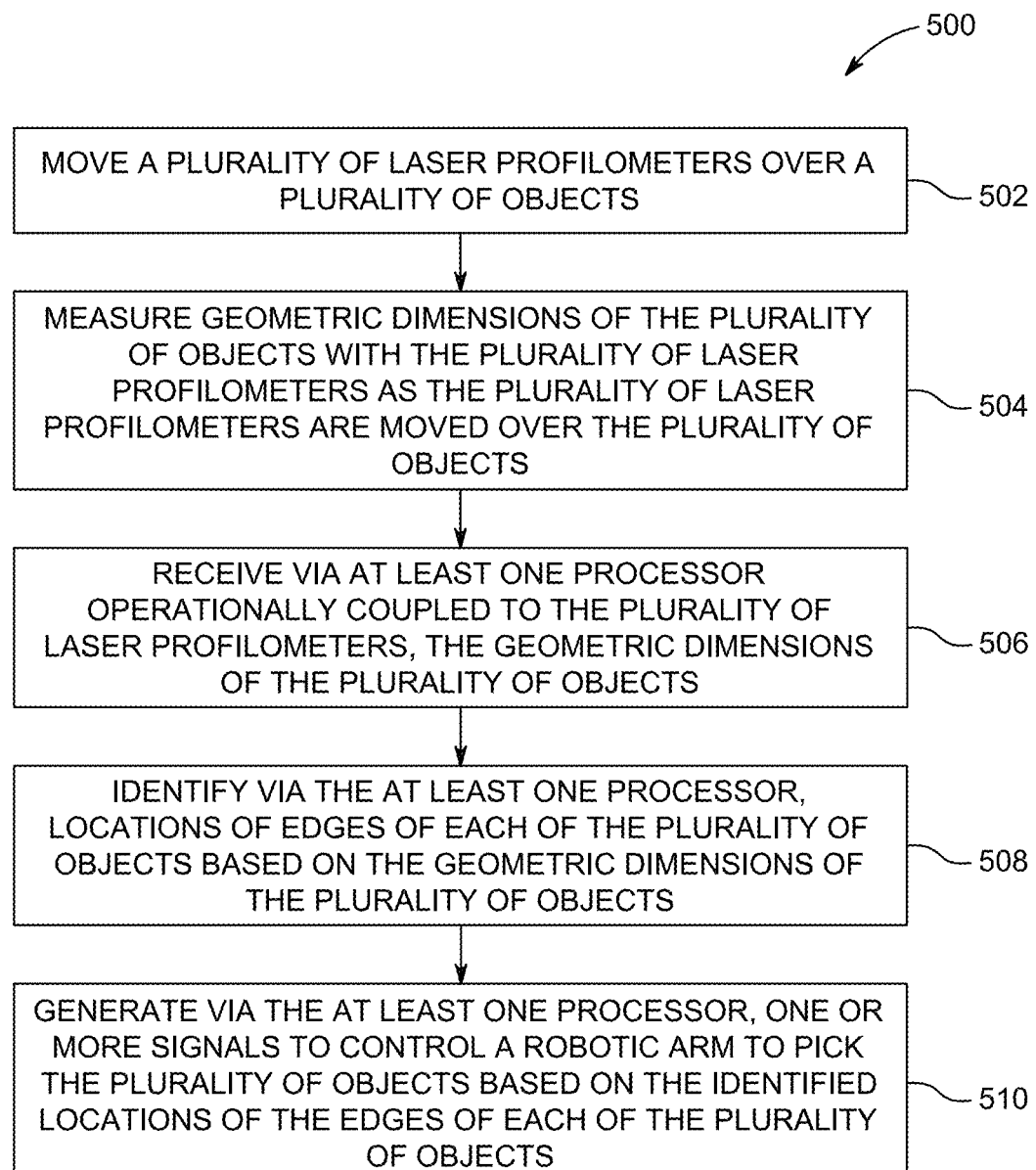

500

MOVE A PLURALITY OF LASER PROFILOMETERS OVER A PLURALITY OF OBJECTS — 502

MEASURE GEOMETRIC DIMENSIONS OF THE PLURALITY OF OBJECTS WITH THE PLURALITY OF LASER PROFILOMETERS AS THE PLURALITY OF LASER PROFILOMETERS ARE MOVED OVER THE PLURALITY OF OBJECTS — 504

RECEIVE VIA AT LEAST ONE PROCESSOR OPERATIONALLY COUPLED TO THE PLURALITY OF LASER PROFILOMETERS, THE GEOMETRIC DIMENSIONS OF THE PLURALITY OF OBJECTS — 506

IDENTIFY VIA THE AT LEAST ONE PROCESSOR, LOCATIONS OF EDGES OF EACH OF THE PLURALITY OF OBJECTS BASED ON THE GEOMETRIC DIMENSIONS OF THE PLURALITY OF OBJECTS — 508

GENERATE VIA THE AT LEAST ONE PROCESSOR, ONE OR MORE SIGNALS TO CONTROL A ROBOTIC ARM TO PICK THE PLURALITY OF OBJECTS BASED ON THE IDENTIFIED LOCATIONS OF THE EDGES OF EACH OF THE PLURALITY OF OBJECTS — 510

FIG. 5

ROBOTIC DEPALLETIZATION SYSTEM AND METHOD

TECHNOLOGICAL FIELD

Example embodiments of the present disclosure generally relates to a depalletization system, and more particularly relates to a robotic depalletization system and a method.

BACKGROUND

A robotic depalletization system is an advanced automation solution designed to efficiently unload and handle products from pallets using robotic technology. In many industrial settings, a vision system of a robotic depalletization system is employed to assist with identification of the position or size of objects on the pallet. The vision system is often installed at high elevated positions, making the vision system difficult to access for adjustments or maintenance. Due to fixed positions of the vision system, the vision system must operate over variable working distances, which can complicate effectiveness and reliability of the vision system. The setup of the vision system typically requires the vision system to be placed farther away from the products the vision systems are monitoring, which in turn necessitates higher resolution and finer quality lenses and sensors to accurately detect small feature sizes from a distance. Such need for additional resolution and superior quality lenses significantly drives up the costs associated with the vision systems.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a robotic depalletization system is disclosed. The robotic depalletization system comprises a robotic arm comprising an end effector. The robotic arm is configured to pick a plurality of objects. Further, the robotic depalletization system comprises a vision system. The vision system comprises a first rail. The vision system further comprises a first actuator configured to move the first rail in a horizontal direction over the plurality of objects. The vision system further comprises a plurality of laser profilometers coupled to the first rail. The plurality of laser profilometers is configured to measure geometric dimensions of the plurality of objects while the first rail is moved over the plurality of objects. Further, the robotic depalletization system comprises at least one processor operationally coupled to the plurality of laser profilometers. The at least one processor is configured to receive the geometric dimensions of the plurality of objects. Further, the at least one processor is configured to identify locations of edges of each of the plurality of objects based on the geometric dimensions of the plurality of objects. Thereafter, the at least one processor is configured to generate one or more signals to control the robotic arm to pick the plurality of objects based on the identified locations of the edges of each of the plurality of objects.

In some embodiments, each of the plurality of laser profilometers are configured to surface scan the plurality of objects placed on a pallet while the first actuator moves the first rail in the horizontal direction to measure the geometric dimensions of the plurality of objects.

In some embodiments, movement of the first rail in the horizontal direction over the plurality of objects enables the plurality of laser profilometer array to move out of way for the robotic arm to pick the plurality of objects.

In some embodiments, the vision system further comprises a second rail and a second actuator. The second actuator is configured to move the first rail in a vertical direction relative to the second rail and relative to the plurality of objects.

In some embodiments, each of the plurality of laser profilometers defines a predefined range for measuring the geometric dimensions of the plurality of objects.

In some embodiments, a vertical direction movement of the first rail enables the plurality of laser profilometers to keep the plurality of objects within the predefined range as the plurality of objects are picked by the robotic arm. In some embodiments, the predefined range defines a distance between D1 and D2.

In some embodiments, the robotic depalletization system further comprises a plurality of 2D image capturing devices positioned in a diametric view of the plurality of objects. The 2D image capturing devices are configured to capture a sequence of images of the plurality of objects during the picking and placing of the plurality of objects by the robotic arm.

In some embodiments, the at least one processor is configured to determine when at least one of the plurality of object being depalletized by the robotic arm clears adjacent objects of the plurality of objects, based at least on the captured sequence of images.

In some embodiments, the at least one processor is configured to send one or more signals to the robotic arm to cut short vertical lift motion of the robotic while the plurality of objects being depalletized, based on the determination of when the at least one of the plurality of object clears the adjacent objects.

In another example embodiment, a method is disclosed. The method comprising steps of moving a plurality of laser profilometers over a plurality of objects. The method further comprising measuring geometric dimensions of the plurality of objects with the plurality of laser profilometers as the plurality of laser profilometers are moved over the plurality of objects. The method further comprising receiving, via at least one processor operationally coupled to the plurality of laser profilometers, the geometric dimensions of the plurality of objects. Further, the method comprising identifying, via the at least one processor, locations of edges of each of the plurality of objects based on the geometric dimensions of the plurality of objects. Thereafter, the method comprising steps of generating, via the at least one processor, one or more signals to control a robotic arm to pick the plurality of objects based on the identified locations of the edges of each of the plurality of objects.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
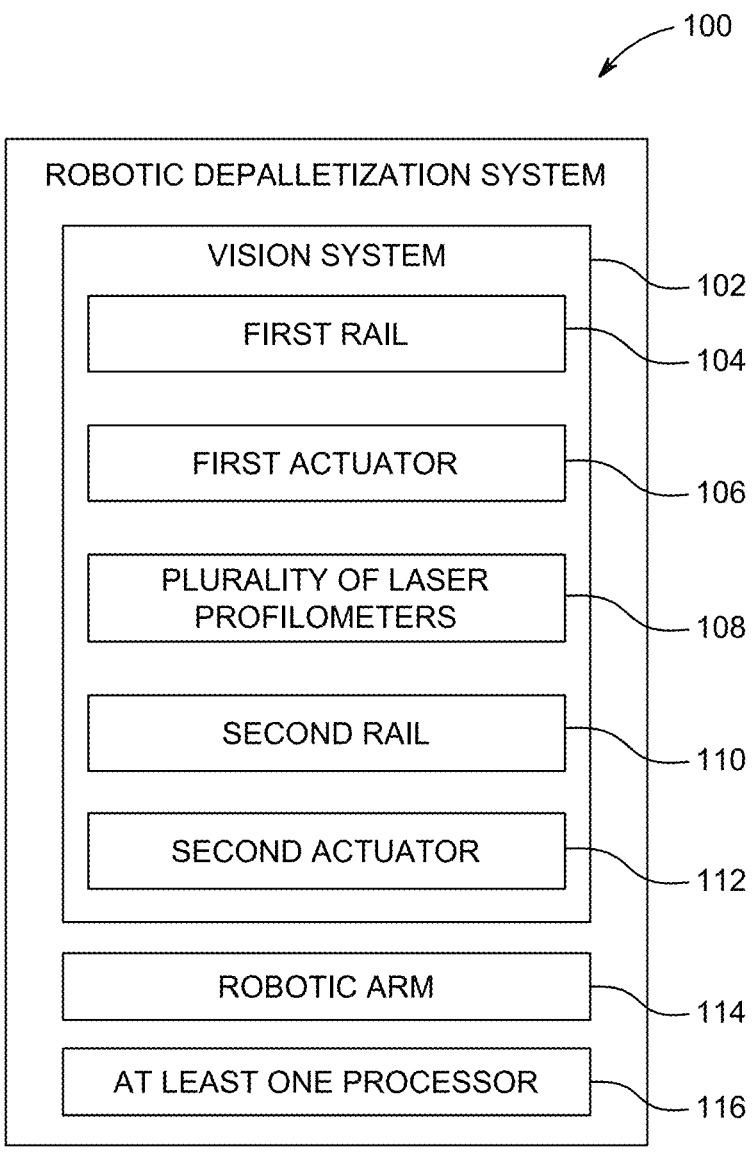
Figure 2:
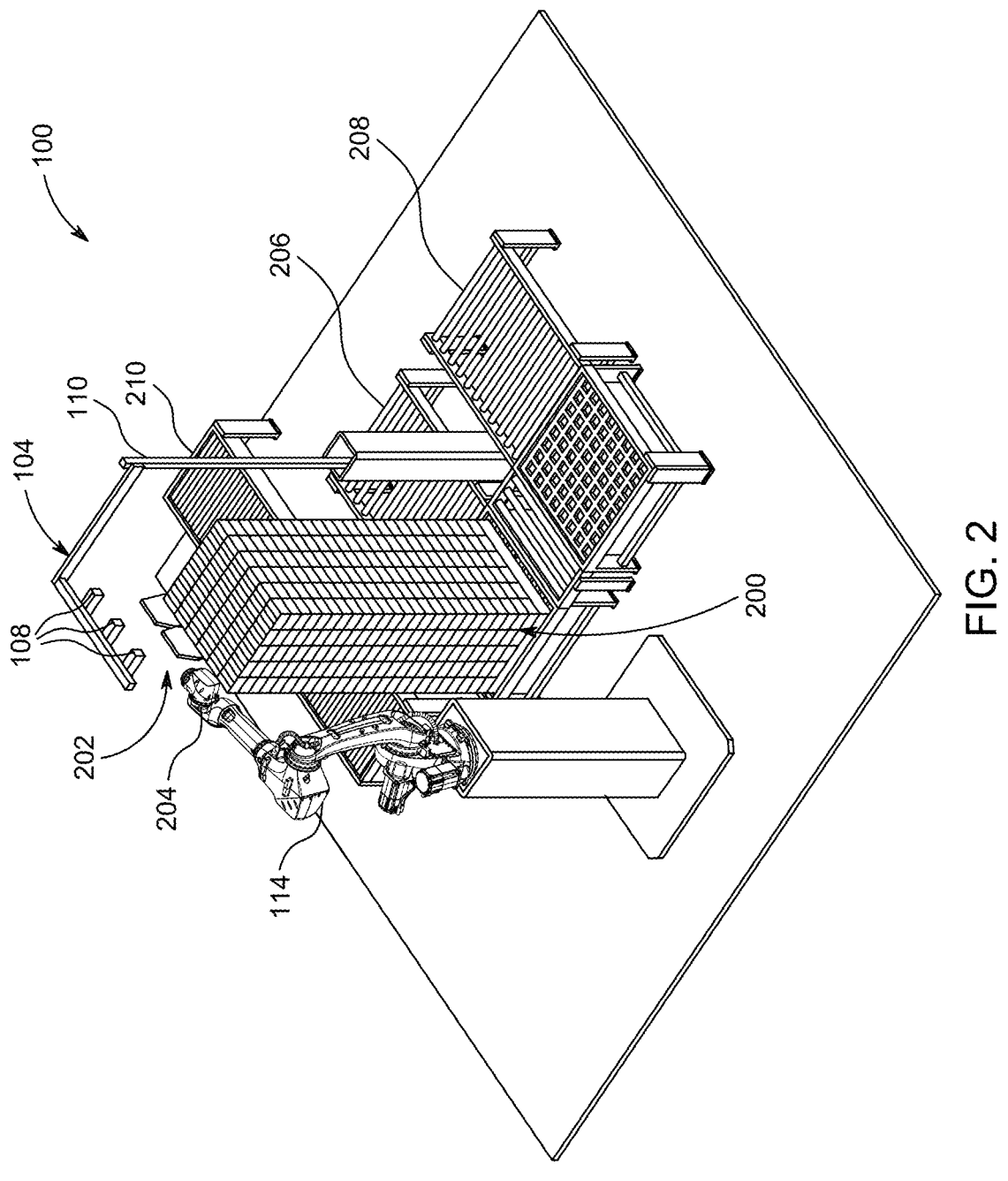
Figure 3A:
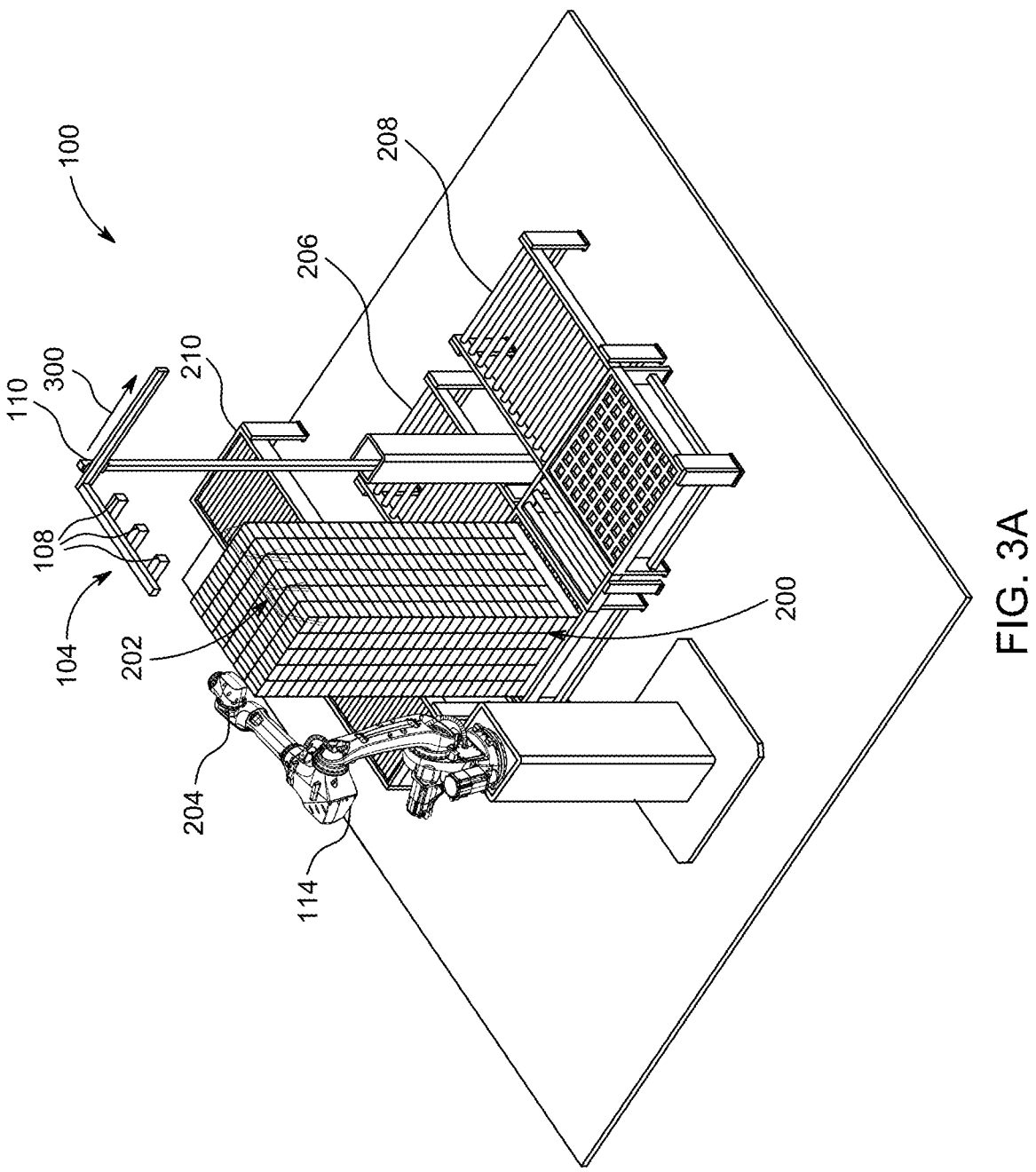
Figure 3B:
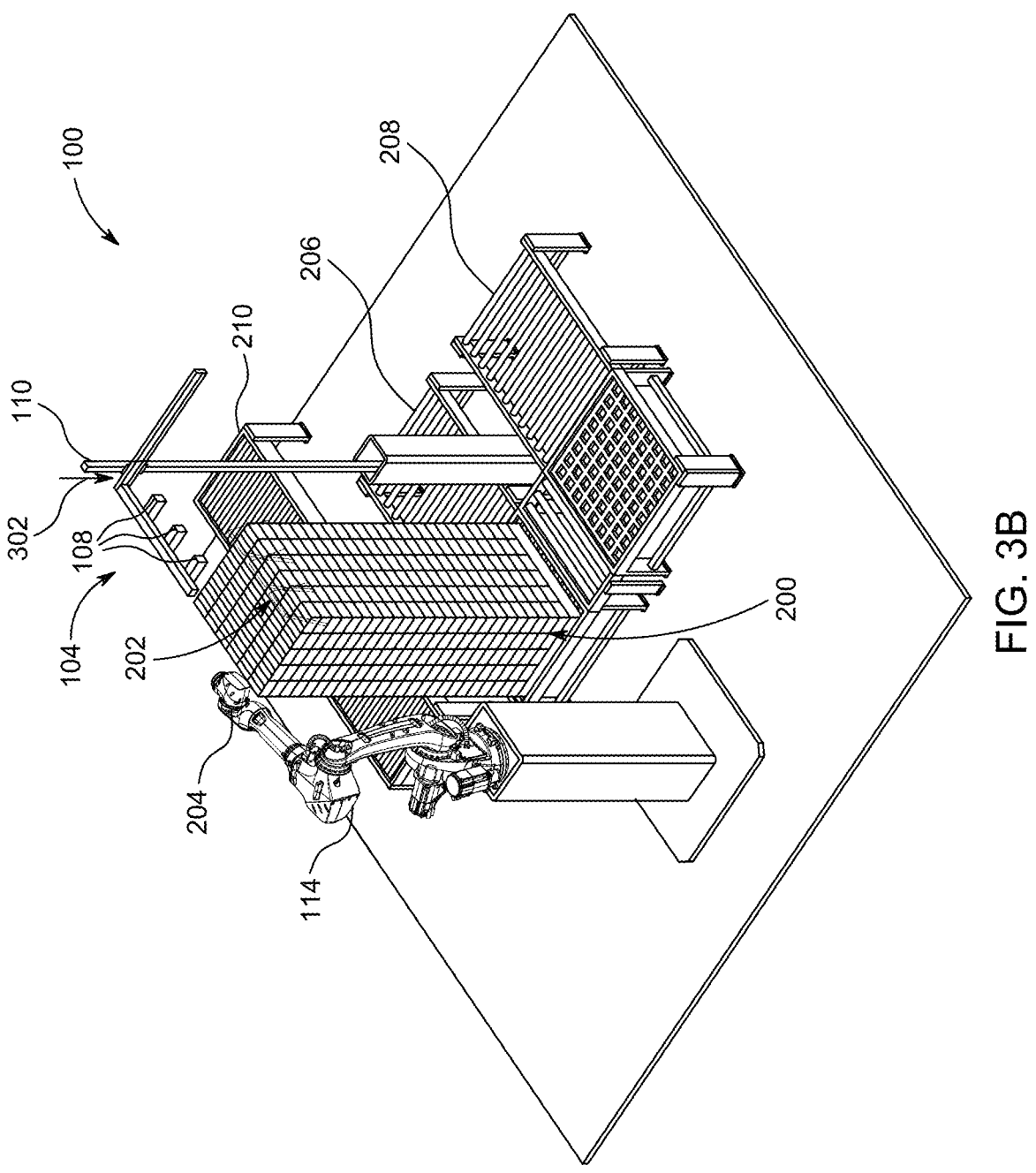
Figure 4:
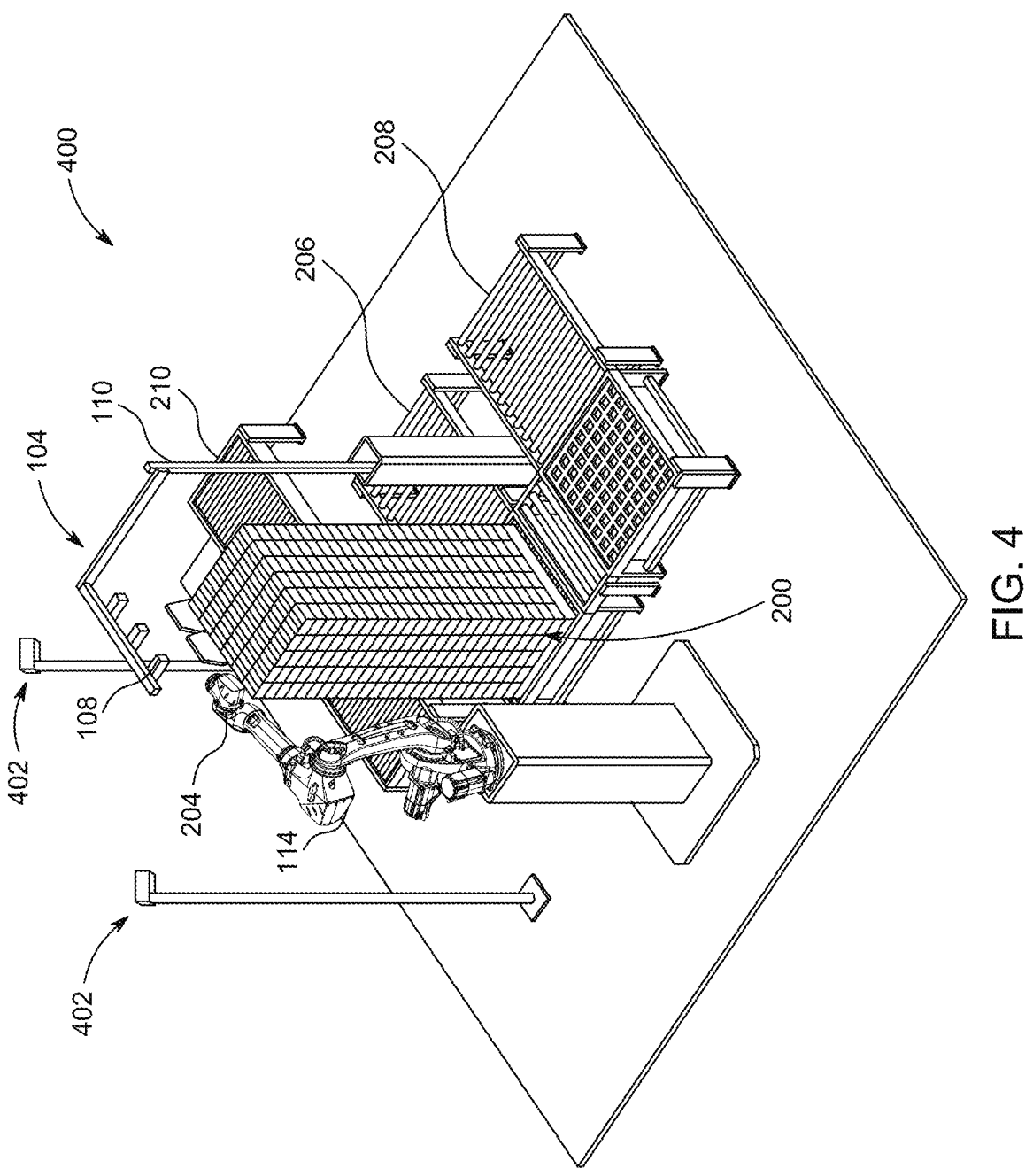

Having thus described certain example embodiments of the present disclosure in general terms, reference will hereinafter be made to the accompanying drawings, which are not necessarily drawn to scale, and wherein:

FIG. 1 illustrates a block diagram of a robotic depalletization system in accordance with a first embodiment of the present disclosure;

FIG. 2 illustrates a system diagram of the robotic depalletization system in accordance with the first embodiment of the present disclosure;

FIG. 3A illustrates movement of a first rail in a horizontal direction in accordance with the first embodiment of the present disclosure;

FIG. 3B illustrates movement of the first rail in a vertical direction in accordance with the first embodiment of the present disclosure;

FIG. 4 illustrates integration of a plurality of 2D image capturing devices to the robotic depalletization system in accordance with a second embodiment of the present disclosure; and FIG. 5 illustrates a flowchart showing a method to depalletize a plurality of objects in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of a robotic depalletization system and a method to depalletize a plurality of objects. Embodiments may be configured to pick a plurality of objects. Embodiments may be configured to move a first rail in a horizontal direction over the plurality of objects. Further, embodiments may be configured to measure geometric dimensions of the plurality of objects while the first rail is moved over the plurality of objects. Further, embodiments may be configured to receive the geometric dimensions of the plurality of objects. Embodiments may be further configured to identify locations of edges of each of the plurality of objects based on the geometric dimensions of the plurality of objects. Embodiments may be further configured to generate one or more signals to control the robotic arm to pick the plurality of objects based on the identified locations of the edges of each of the plurality of objects.

FIG. 1 illustrates a block diagram of a robotic depalletization system 100, in accordance with a first embodiment of the present disclosure. FIG. 2 illustrates a system diagram of the robotic depalletization system 100, in accordance with the first embodiment of the present disclosure. FIG. 3A illustrates movement of a first rail 104 in a horizontal direction, in accordance with the first embodiment of the present disclosure. FIG. 3B illustrates movement of the first rail 104 in a vertical direction, in accordance with the first embodiment of the present disclosure.

The robotic depalletization system 100 may comprise a vision system 102, at least one processor 116, and a robotic arm 114. In some embodiments, the vision system 102 may comprise a first rail 104, a first actuator 106, and a plurality of laser profilometers 108. The first rail 104 may be a horizontal rail and may be moved by the first actuator 106. In some embodiments, the first rail 104 may be a L-shaped structure. In some embodiments, the first actuator 106 may correspond to a horizontal actuator. The first actuator 106 may be coupled to the first rail 104 and may be configured to move the first rail 104 in a horizontal direction (as shown by 300 in FIG. 3A) over a plurality of objects 200. The plurality of objects 200 may be placed over a pallet. The first actuator 106 may be a linear motion actuator that may translate rotational motion from a motor into linear displacement.

In some embodiments, the plurality of laser profilometers 108 are coupled to the first rail 104. The plurality of laser profilometers 108 may be configured to measure geometric dimensions of the plurality of objects 200 while the first rail 104 is moved over the plurality of objects 200. Further, each of the plurality of laser profilometers 108 may be configured to surface scan the plurality of objects 200 placed on the pallet while the first actuator 106 moves the first rail 104 in the horizontal direction (as shown by 300) to measure the geometric dimensions of the plurality of objects 200. Each of the plurality of laser profilometers 108 may emit a laser beam to surface scan the plurality of objects 200. In some embodiments, the surface scanning by the plurality of laser profilometers 108 may involve a technique to measure surface profile, roughness, and topography of plurality of objects 200 with high precision. The plurality of laser profilometers 108 may use laser beams to capture detailed surface characteristics by scanning across a surface of the plurality of objects 200.

In some embodiments, each of the plurality of laser profilometers 108 may comprise a laser emitter and a plurality of sensors. In some embodiments, as the first rail 104 moves horizontally (as shown by 300), the plurality of laser profilometers 108 moves along with the first rail 104. In some embodiments, during the movement, each of the plurality of plurality of laser profilometers 108 (e.g., the laser emitters of each laser profilometer 108) may be configured to emit a laser beam directed towards the surface of the plurality of objects 200 and within a field of view (FoV) 202. In some embodiments, as the laser beam hits the surface of the plurality of objects 200, the reflected laser beam is received by the plurality of laser profilometers 108 (e.g., by the sensor of each laser profilometer 108). Further, the plurality of laser profilometers 108 may measure distance from a source of the laser beam to the surface of the plurality of objects 200 by analyzing the reflected laser beam and generates data in response. Further, the generated data may be processed to create a detailed map of profile of the surface of the plurality of objects 200 showing variations in height and texture, that are further displayed in 2D or 3D representations of the surface of the plurality of objects 200.

Further, the plurality of laser profilometers 108 may have a predefined range for measuring the geometric dimensions of the plurality of objects 200. The predefined range may define a distance between D1 and D2. Each of the plurality of laser profilometers 108 may be coupled to the first rail 104 and moving the plurality of laser profilometers 108 over the plurality of objects 200 may comprise moving the first rail 104 over the plurality of objects 200 with the first actuator 106.

In some embodiments, the vision system 102 may further comprise a second rail 110 and a second actuator 112. The second actuator 112 may be configured to move the first rail 104 in a vertical direction (as shown by 302 in FIG. 3B) relative to the second rail 110 and relative to the plurality of objects 200. Further, the second rail 110 may correspond to a vertical rail. The first rail 104 may be coupled to the second rail 110 having the second actuator 112. The second rail 110 may extend from a base plane of the robotic depalletization system 100 and may be configured to adjust the height of the plurality of laser profilometers 108 coupled to the first rail 104. The second rail 110 may ensure that the plurality of laser profilometers 108 may be positioned at an optimal height above the top layer of the plurality of objects 200 placed on the pallet for accurate surface scanning of the plurality of objects 200. The plurality of laser profilometers 108 may move vertically relative to the plurality of objects 200 (as shown by 302). In some embodiments, the first rail 104 and the second rail 110 is made from a group of materials, including, but is not limited to, anodized aluminum, stainless steel, hardened steel, and extruded aluminum alloy.

In some embodiments, the vertical direction movement (as shown by 302) of the first rail 104 may enable the plurality of laser profilometers 108 to keep the plurality of objects within the predefined range as the plurality of objects 200 are picked by the robotic arm 114. The predefined range may define a distance between D1 and D2. The predefined range is defined as the distance between two points, D1 and D2, which represent the minimum and maximum distances at which the plurality of laser profilometers 108 may effectively surface scan the plurality of objects 200. Further, a distance between each of the plurality of laser profilometers 108 and the plurality of objects 200 that is within the predefined range may be maintained.

In some embodiments, the robotic depalletization system 100 may comprise the at least one processor 116. In some embodiments, the at least one processor 116 may correspond to a controller for executing one or more operations within a server. The at least one processor 116 may be operationally coupled to the plurality of laser profilometers 108. The at least one processor 116 may be configured to receive the geometric dimensions of the plurality of objects 200. The geometric dimensions of the plurality of objects 200 may be measured by the plurality of laser profilometers 108. The geometric dimensions of the plurality of objects 200 may determine size and orientation of the plurality of objects 200. In some embodiments, upon measuring the geometric dimensions of the plurality of objects 200, the plurality of laser profilometers 108 may transmit the measured geometric dimensions of the plurality of objects 200 to the at least one processor 116.

Further, the at least one processor 116 may be configured to identify locations of edges of each of the plurality of objects 200 based on the geometric dimensions of the plurality of objects 200. The edges of each of the plurality of objects 200 may indicate where each of the plurality of objects 200 may end, and another object of the plurality of objects 200 may begin. The exact locations of the edges of each of the plurality of objects 200 may allow the robotic arm 114 to know where the robotic arm 114 may grab each of the plurality of objects 200.

Further, the at least one processor 116 may be configured to generate one or more signals to control the robotic arm 114 to pick the plurality of objects 200 based on the identified locations of the edges of each of the plurality of objects 200. The robotic arm 114 may comprise an end effector 204. The robotic arm 114 may be configured to pick the plurality of objects 200 via the end effector 204. The one or more signals may define how to move the robotic arm 114, where to position the robotic arm 114, and how to pick up each of the plurality of objects 200 without disturbing other objects of the plurality of objects 200.

In some embodiments, the end effector 204 may comprise a gripper or a suction cup to grip and carry the plurality of objects 200. The gripper or the suction cup may be configured to securely grasp and lift the each of the plurality of objects 200. The robotic arm 114 may be capable of handling the plurality of objects 200 of different shapes, sizes, and weights. The robotic arm 114 may be configured to operate continuously with minimal human intervention. The robotic arm 114 may automate loading of the plurality of objects 200 into pallet outfeed, and unloading from pallet infeed.

In some embodiments, movement of the first rail 104 in the horizontal direction (as shown by 300) over the plurality of objects 200 may enable the plurality of laser profilometers 108 to move out of way for the robotic arm 114 to pick the plurality of objects 200 (as shown in FIG. 3A). Once the plurality of laser profilometers 108 scans the plurality of objects 200, the first rail 104 may move out of the depalletization area along with the plurality of laser profilometers 108. Moving out of the depalletization area may allow the robotic arm 114 to pick the plurality of objects 200 without any obstruction from the vision system 102.

In some embodiments, the at least one processor 116 is configured to determine a product clearance on the pallet based at least on the received geometric dimensions of the plurality of objects 200 on the pallet. The at least one processor 116 may be further configured to determine whether the plurality of objects 200 may be successfully picked, lifted, and cleared from the pallet. Further, the at least one processor 116 may be configured to control height adjustment of the plurality of laser profilometers 108 based at least on the clearance of the plurality of objects 200 on the pallet. The at least one processor 116 may send commands to the second actuator 112 to adjust the height of the plurality of laser profilometers 108.

In some embodiments, the at least one processor 116 is further configured to determine when the at least one of the plurality of objects 200 being depalletized by the robotic arm 114 clears adjacent objects of the plurality of objects 200, based at least on the captured sequence of images by a plurality of 2D image capturing devices 402 (described in detail in FIG. 4). Further, the at least one processor 116 is configured to send one or more signals to the robotic arm 114 to cut short vertical lift motion of the robotic arm 114 while the plurality of objects 200 being depalletized, based on the determination of when the at least one of the plurality of object clears the adjacent objects. In another scenario, in case one of the plurality of objects 200 is position in corners or sides of pile of the plurality of objects 200, the robotic arm 114 may move sideways (restricting any vertical movement) towards a free space to depalletize the one of the plurality of objects 200.

The at least one processor 116 may include suitable logic, circuitry, and/or interfaces that are operable to execute one or more instructions stored in a memory to perform predetermined operations. In some embodiments, the at least one processor 116 may be configured to store the geometric dimensions of the plurality of objects 200 in the memory communicatively coupled to the at least one processor 116. In one embodiment, the at least one processor 116 may be configured to decode and execute any instructions received from one or more other electronic devices or server(s). The at least one processor 116 may be configured to execute one or more computer-readable program instructions, such as program instructions to carry out any of the functions described in this description. Further, the processor may be implemented using the at least one processor 116 technologies known in the art. Examples of the at least one processor 116 include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

In some embodiments, the robotic depalletization system 100 may further comprise a first conveyor 206, a second conveyor 208 and a third conveyor 210. The first conveyor 206 may correspond to a pallet infeed conveyor. The second conveyor 208 may correspond to a pallet outfeed conveyor. The third conveyor 210 may correspond to a product takeaway conveyor. In some embodiments, the pallet (containing the plurality of objects 200) may be placed onto the first conveyor 206. The first conveyor 206 may be configured to transport the incoming pallet to the depalletization area. As the pallet may be transported to the depalletization area, the pallet may enter a field-of-view (FoV) of the plurality of 2D image capturing devices 402 and plurality of laser profilometers 108.

In some embodiments, once the pallet enters the depalletization area, the robotic arm 114 may pick the plurality of objects 200 from the pallet. The robotic arm 114 may pick each of the plurality of objects 200 from the pallet. Further, the robotic arm 114 may adjust the height and orientation based at least on the product clearance and position of the plurality of objects 200. In some embodiments, after the plurality of objects 200 may be picked by the robotic arm 114, the robotic arm 114 may be configured to transport the picked plurality of objects 200 to the third conveyor 210. The third conveyor 210 may transport the plurality of objects 200 away from the depalletization area. The plurality of objects 200 may be transported to a next stage. The next stage may include inspection, packaging, or further processing. Once the plurality of objects 200 transported to the third conveyor 210, the pallet may be emptied. In some embodiments, the emptied pallet may be moved onto the second conveyor 208. The second conveyor 208 may transport the emptied pallet out of the depalletization area.

It will be apparent to one skilled in the art the above-mentioned components of the robotic depalletization system 100 have been provided only for illustration purposes, without departing from the scope of the disclosure.

FIG. 4 illustrates integration of the plurality of 2D image capturing devices 402 to a robotic depalletization system 400, in accordance with a second embodiment of the present disclosure.

In some embodiments, the robotic depalletization system 400 may further comprise the plurality of 2D image capturing devices 402 positioned in a diametric view of the plurality of objects 200. The plurality of 2D image capturing devices 402 may be configured to capture a sequence of images of the plurality of objects 200 during the picking and placing of the plurality of objects 200 by the robotic arm 114. In some embodiments, the plurality of 2D image capturing devices 402 may be further configured to monitor the plurality of objects 200. The plurality of 2D image capturing devices 402 may be configured to monitor the plurality of objects 200 from the dimetric view. The plurality of 2D image capturing devices 402 may be positioned in the dimetric view to monitor a close side of the plurality of objects 200. The plurality of 2D image capturing devices 402 may be configured to capture the sequence of images of the plurality of objects 200 on the pallet from a plurality of angles. The plurality of 2D image capturing devices 402 may correspond to two 2D cameras.

In some embodiments, the height of the plurality of laser profilometers 108 may be adjusted based at least on the sequence of images captured from the plurality of 2D image capturing devices 402. The plurality of 2D image capturing devices 402 may be further configured to monitor the clearance of the plurality of objects 200 from the pallet. The sequence of images captured from the plurality of 2D image capturing devices 402 may be sent to the at least one processor 116. In some embodiments, data corresponding to the monitored clearance of the plurality of objects 200 from the pallet may be sent to the at least one processor 116. The at least one processor 116 may control the second actuator 112 to adjust the height of plurality of laser profilometers 108. The at least one processor 116 may ensure the plurality of laser profilometers 108 may maintain an appropriate distance from the top layer of the plurality of objects 200 on the pallet.

In some embodiments, the at least one processor 116 is further configured to determine when the at least one of the plurality of objects 200 being depalletized by the robotic arm 114 clears adjacent objects of the plurality of objects 200, based at least on the captured sequence of images by the plurality of 2D image capturing devices 402. For example, the at least one processor 1106 may be configured to determine that a bottom-most point of the object to be picked is positioned higher than a top-most point of adjacent objects and has therefore "cleared" the adjacent objects. Further, the at least one processor 116 is configured to send one or more signals to the robotic arm 114 to cut short vertical lift motion of the robotic arm 114 while the plurality of objects 200 being depalletized, based on the determination of when the at least one of the plurality of object clears the adjacent objects.

In some embodiments, the plurality of 2D image capturing devices 402 may be positioned at fixed places. The plurality of 2D image capturing devices 402 may be mounted at an elevated height. The plurality of 2D image capturing devices 402 mounted at the elevated height may be configured to provide an unobstructed view of the plurality of objects 200 on the pallet. The unobstructed view of the plurality of 2D image capturing devices 402 may be configured to capture the sequence of images of each of the plurality of objects 200 on the pallet.

In some embodiments, the plurality of 2D image capturing devices 402 may be equipped with the plurality of sensors. The plurality of sensors may correspond to a high-resolution sensor. The plurality of sensors may comprise, but is not limited to, a CMOS sensor, an Infrared (IR) sensor, a LiDAR sensor, a color sensor, and a depth sensor. The plurality of 2D image capturing devices 402 may be further equipped with a plurality of lenses. The plurality of lenses may be configured to enable fine-tuning of focus and zoom to accommodate varying heights of the plurality of objects 200 on the pallet. In some embodiments, the plurality of 2D image capturing devices 402 may work in tandem with the plurality of laser profilometers 108. The plurality of 2D image capturing devices 402 may be configured to monitor when the plurality of objects 200 may be lifted clear of the pallet. The plurality of 2D image capturing devices 402 may be further configured to monitor the product clearance on the pallet.

FIG. 5 illustrates a flowchart 500 showing a method to depalletize the plurality of objects 200, in accordance with an example embodiment of the present disclosure.

At operation 502, the plurality of laser profilometers 108 is moved over the plurality of objects 200. The first actuator 106 may be coupled to the first rail 104 and may be configured to move the first rail 104 in the horizontal direction (as shown by 300) over the plurality of objects 200. The plurality of laser profilometers 108 may be coupled to the first rail 104. Further, the plurality of laser profilometers 108 may move in the horizontal direction (as shown by 300) over the plurality of objects 200 along with the first rail 104.

At operation 504, the plurality of laser profilometers 108 may be moved over the plurality of objects 200 to measure the geometric dimensions of the plurality of objects 200. The plurality of laser profilometers 108 may be configure d to measure geometric dimensions of the plurality of objects 200 while the first rail 104 may be moved over the plurality of objects 200. The plurality of laser profilometers 108 may use laser technology to measure the geometric dimensions of the plurality of objects 200. Each of the plurality of laser profilometers 108 may emit a laser beam to surface scan the plurality of objects 200.

At operation 506, the at least one processor 116 that is operationally coupled to the plurality of laser profilometers 108, may receive the geometric dimensions of the plurality of objects 200. The geometric dimensions of the plurality of objects 200 may be measured by the plurality of laser profilometers 108. The geometric dimensions of the plurality of objects 200 may determine size, and orientation of the plurality of objects. In some embodiments, upon measuring the geometric dimensions of the plurality of objects 200, the plurality of laser profilometers 108 may transmit the measured geometric dimensions of the plurality of objects 200 to the at least one processor 116.

At operation 508, the at least one processor 116 may identify locations of edges of each of the plurality of objects 200 based on the geometric dimensions of the plurality of objects 200. In some embodiments, the at least one processor 116 may be configured to identify locations of edges of each of the plurality of objects 200 based on the geometric dimensions of the plurality of objects 200. The edges of each of the plurality of objects 200 may indicate where each of the plurality of objects 200 may end, and another plurality of objects 200 may begin. The exact locations of the edges of each of the plurality of objects 200 may allow the robotic arm 114 to know where the robotic arm 114 may grab each of the plurality of objects 200.

At operation 510, the at least one processor 116 may generate one or more signals to control the robotic arm 114 to pick the plurality of objects 200 based on the identified locations of the edges of each of the plurality of objects 200. In some embodiments, the at least one processor 116 may be configured to generate the one or more signals to control the robotic arm 114 to pick the plurality of objects 200 based on the identified locations of the edges of each of the plurality of objects 200. The robotic arm 114 may comprise the end effector 204. The robotic arm 114 may be configured to pick the plurality of objects 200. The one or more signals may comprise how to move the robotic arm 114, where to position the robotic arm 114, and how to pick up each of the plurality of objects 200 without disturbing the another plurality of objects 200.

In some embodiments, the applications of the plurality of 2D image capturing devices 402 and the plurality of laser profilometers 108 may include industrial automation, warehouse and logistics management, manufacturing and production lines, food and beverage industry, retail and e-commerce fulfillment, pharmaceuticals and healthcare, logistics and transportation, and construction and building materials.

The present disclosure offers significant advantages by reducing footprint of the vision system 102 through the use of the first rail 104 and the second rail 110 that move the plurality of laser profilometers 108 at a height above the plurality of objects 200. The present disclosure not only ensures accurate identification of the plurality of objects 200 but also allows the plurality of laser profilometers 108 to move out of the way of the robotic arm 114 swiftly, enabling the robotic arm 114 to begin depalletization process without delay. Additionally, the integration of the plurality of 2D image capturing devices 402 in the dimetric views provides real-time monitoring, allowing the at least one processor 116 to determine when the plurality of objects 200 clears the adjacent plurality of objects 200 on the pallet, thus enabling the robotic arm 114 to cut short unnecessary vertical lift motions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A robotic depalletization system comprising:
   a robotic arm comprising an end effector, the robotic arm configured to pick a plurality of objects;
   a vision system comprising:
      a first rail;
      a first actuator configured to move the first rail in a horizontal direction over the plurality of objects; and
      a plurality of laser profilometers coupled to the first rail, the plurality of laser profilometers configured to measure geometric dimensions of the plurality of objects while the first rail is moved over the plurality of objects, wherein each of the plurality of laser profilometers define a predefined range to measure the geometric dimensions of the plurality of objects, and wherein a vertical direction movement of the first rail enables the plurality of laser profilometers to keep the plurality of objects within the predefined range as the plurality of objects picked by the robotic arm; and
   at least one processor operationally coupled to the plurality of laser profilometers, wherein the at least one processor is configured to:
      receive the geometric dimensions of the plurality of objects;
      identify locations of edges of each of the plurality of objects based on the geometric dimensions of the plurality of objects; and
      generate one or more signals to control the robotic arm to pick the plurality of objects based on the identified locations of the edges of each of the plurality of objects.

2. The robotic depalletization system of claim 1, wherein each of the plurality of laser profilometers is configured to surface scan the plurality of objects placed on a pallet while the first actuator moves the first rail in the horizontal direction to measure the geometric dimensions of the plurality of objects.

3. The robotic depalletization system of claim 1, wherein movement of the first rail in the horizontal direction over the plurality of objects enables the plurality of laser profilometers to move out of way for the robotic arm to pick the plurality of objects.

4. The robotic depalletization system of claim 1, wherein the vision system further comprises a second rail and a second actuator, wherein the second actuator is configured to move the first rail in a vertical direction relative to the second rail and relative to the plurality of objects.

5. The robotic depalletization system of claim 1, wherein the predefined range defines a distance between D1 and D2.

6. The robotic depalletization system of claim 1, further comprising a plurality of 2D image capturing devices positioned in a diametric view of the plurality of objects, wherein the plurality of 2D image capturing devices are configured to capture a sequence of images of the plurality of objects during the picking and placing of the plurality of objects by the robotic arm.

7. The robotic depalletization system of claim 6, wherein the at least one processor is configured to determine when at least one of the plurality of object being depalletized by the robotic arm clears adjacent objects of the plurality of objects, based at least on the captured sequence of images.

8. The robotic depalletization system of claim 7, wherein the at least one processor is configured to send one or more signals to the robotic arm to cut short vertical lift motion of the robotic arm while the plurality of objects being depalletized, based on the determination of when the at least one of the plurality of object clears the adjacent objects.

9. A method comprising:
   moving a plurality of laser profilometers coupled to a first rail over a plurality of objects;
   measuring geometric dimensions of the plurality of objects with the plurality of laser profilometers as the plurality of laser profilometers are moved over the plurality of objects, wherein each of the plurality of laser profilometers defines a predefined range for measuring the geometric dimensions of the plurality of objects;
   moving the plurality of laser profilometers vertically relative to the plurality of objects to keep the plurality of objects within the predefined range as the plurality of objects are picked by a robotic arm;
   receiving, via at least one processor operationally coupled to the plurality of laser profilometers, the geometric dimensions of the plurality of objects;
   identifying, via the at least one processor, locations of edges of each of the plurality of objects based on the geometric dimensions of the plurality of objects; and
   generating, via the at least one processor, one or more signals to control the robotic arm to pick the plurality of objects based on the identified locations of the edges of each of the plurality of objects.

10. The method of claim 9, wherein moving the plurality of laser profilometers over the plurality of objects comprises moving the first rail over the plurality of objects with a first actuator.

11. The method of claim 9, wherein the method further comprises maintaining a distance between each of the plurality of laser profilometers and the plurality of objects that is within the predefined range.

12. The method of claim 11, wherein the maintaining the distance between each of the plurality of laser profilometers and the plurality of objects keeps the plurality of objects within the predefined range as the plurality of objects are picked by the robotic arm.

13. The method of claim 9, wherein the predefined range defines a distance between D1 and D2.

14. The method of claim 9, further comprising moving the plurality of laser profilometers such that they are not over the plurality of objects when the robotic arm picks the plurality of objects.

15. The method of claim 9, wherein a plurality of 2D image capturing devices are positioned in a diametric view of the plurality of objects, wherein the method further comprising capturing, with the plurality of 2D image capturing devices, a sequence of images of the plurality of objects during the picking and placing of the plurality of objects by the robotic arm.

16. The method of claim 15, further comprising determining, via the at least one processor, when at least one of the plurality of objects being picked by the robotic arm clears adjacent objects of the plurality of objects, based at least on the captured sequence of images.

17. The method of claim 16, further comprising sending, via the at least one processor, the one or more signals to the robotic arm to cut short vertical lift motion of the robotic arm while the plurality of objects are being depalletized, based on the determination of when the at least one of the plurality of object clears the adjacent objects.

18. A robotic depalletization system comprising:

a robotic arm comprising an end effector, the robotic arm configured to pick a plurality of objects;

a vision system comprising:

a first rail;

a first actuator configured to move the first rail in a horizontal direction over the plurality of objects; and a plurality of laser profilometers coupled to the first rail, the plurality of laser profilometers configured to measure geometric dimensions of the plurality of objects while the first rail is moved over the plurality of objects; and a plurality of 2D image capturing devices positioned in a diametric view of the plurality of objects, wherein the plurality of 2D image capturing devices are configured to capture a sequence of images of the plurality of objects during the picking and placing of the plurality of objects by the robotic arm; and at least one processor operationally coupled to the plurality of laser profilometers, wherein the at least one processor is configured to:

receive the geometric dimensions of the plurality of objects;

identify locations of edges of each of the plurality of objects based on the geometric dimensions of the plurality of objects; and generate one or more signals to control the robotic arm to pick the plurality of objects based on the identified locations of the edges of each of the plurality of objects.

* * * * *